J. J. EAGLETON.

Annealing Wire.

No. 373.

Reissued June 24, 1856.

AM. PHOTO-LITHO. CO. N. Y. (OSBORNE'S PROCESS.)

UNITED STATES PATENT OFFICE.

J. JOSEPH EAGLETON, OF NEW YORK, N. Y.

IMPROVEMENT IN ANNEALING-FURNACES.

Specification forming part of Letters Patent No. 14,908, dated May 20, 1856; Reissue No. 373, dated June 24, 1856.

*To all whom it may concern:*

Be it known that I, J. J. EAGLETON, of the city, county, and State of New York, have invented certain new and useful Improvements in Furnaces for Annealing Iron Wire and other Similar Iron Articles; and I hereby declare and ascertain the nature and purpose thereof, reference being had to the accompanying drawings, in which—

Figure 2:
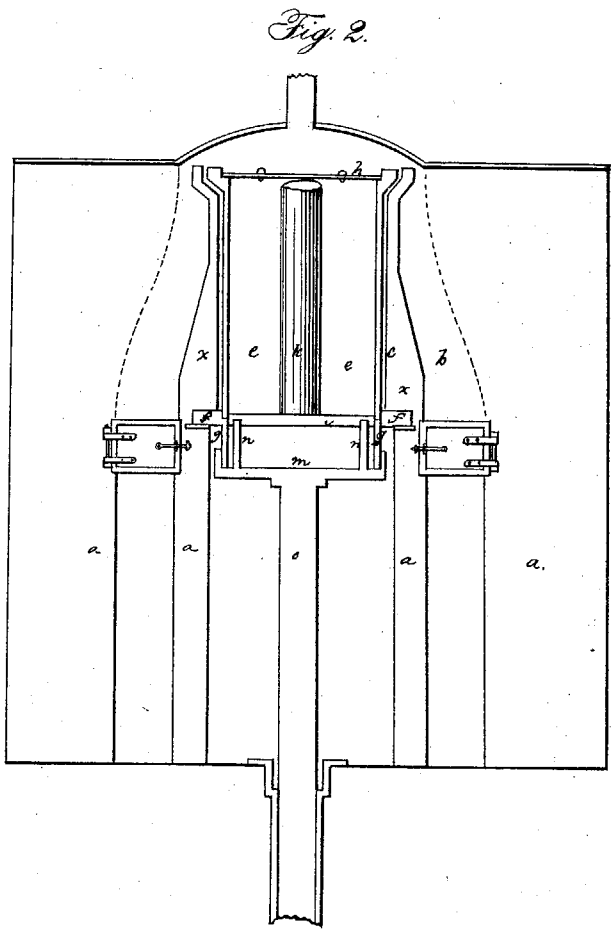
Figure 1:
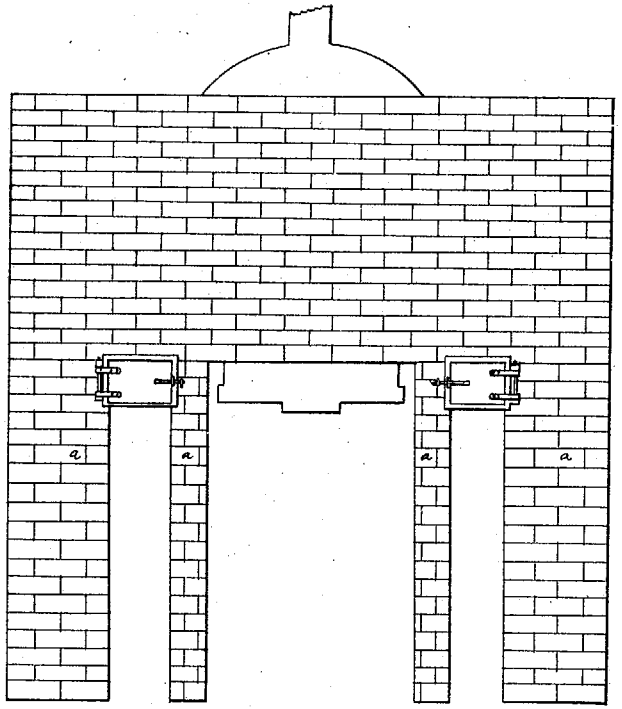

Figure 1 is a side elevation of the furnace. Fig. 2 is a vertical section thereof.

Iron wire must be inclosed air-tight during the process of annealing; otherwise it will form a thick scale on its surface, which materially injures it.

The method heretofore pursued in annealing iron wire has been to take an iron cylinder and surround it with brick-work at some distance therefrom, and between said cylinder and the brick-work make a fire for heating it. Into the cylinder wire in coils was put loosely, and when filled the open top was closed by a cover shutting air-tight, it being necessary to prevent a current of air from the wire while heating. When the wire was properly annealed, the cover was removed and the wire lifted out by hooks, a portion at a time, and the furnace again recharged by putting the separate coils into the cylinder. This process had many defects. First, the workmen were exposed to great heat, and in throwing in the coils of wire to fill the cylinder they lay in a very irregular manner, and as they soften are bent out of form. Again, in hooking up the highly-heated soft wire it is often injured in its form and surface. Short bends were made in it, often requiring it to be redrawn to make it merchantable. Besides, much time was wasted in filling and discharging a cylinder, and the loss of heat and consequent increased cost of fuel was very great, particularly as it was necessary to lower the temperature before opening the cylinder, in order to allow the workmen to approach it. My invention is designed to obviate all these defects, and is constructed as follows: I build a furnace of brick-work or other masonry, leaving an annular chamber for the furnace. This is elevated a proper height on piers *a a*, Figs. 1 and 2. Within the annular walls of this chamber there is a space, *e*, in which an iron cylinder is placed, (lettered *e'*, Fig. 2.) This is somewhat smaller than the space, so as to allow for its expansion and contraction, as clearly shown in the figure. The lower end of the cylinder *e'* rests on an annular flange, *f*, there being a rabbet therein to make the joint, and from the flange *f* a cylindrical projection is made downward, (lettered *g*,) of the same interior diameter as the cylinder *e'*. Above, the cover *h* is luted on. A disk, *i*, of cast-iron, is made nearly to fit the interior circumference of the cylinder *e'*, and at the center of this disk *i*, I attach a small cylinder, *k*. The disk *i* is supported at a certain elevation above the cup-formed casting *m* on standards *n*, as seen in the figure, so that when the cup *m* is brought up and shuts over the projection *g* the plate *i* will be within the cylinder, and a double bottom will thus be made thereto. The cup *m* is supported on a pillar, *o*, by which it is raised and lowered with any known mechanical power or device applicable to the purpose and with which mechanicians are familiar. To operate this device thus constructed fires are made and kept up continuously in the furnaces *b*, the cup and its accessories are lowered, and a disk, *i*, carefully packed with coils of wire not exceeding the size of the cylinder *e* till the cup shuts into the flange *g*, where it can be luted, if necessary. In this state of the apparatus the wire is properly heated and annealed in an air-tight chamber. The inner brick-work of the fire-chamber serves to shield the cylinder from a too forcible interior heat from the fire, and it is thus protected from warping. When the process is completed, without reducing the fire or opening a current of air through the cylinder, the cup *m* is lowered, and the wire charge with it, onto a truck placed in a position to receive it, by which the charge is taken off on one side to cool, while at the same time another truck, with the bottom apparatus for the cylinder loaded with cold wire, is brought up and raised into the cylinder, and the process continues. It is obvious that the charge, when annealed and the bottom of the cylinder opened, could be thrown off into water, if desired, or it might, by turning the cylinder horizontal in setting it in the furnace, be opened at the sides; but as this is entirely obvious it needs but to be named. By thus charging the furnace the wire is packed smoothly, which is not the case by the old method, and it remains undisturbed till it is cool enough to handle without bending or injury. It is at all times supported in its cylindrical form—a matter of great importance to the trade—and more equally, expeditiously, and economically annealed than by any other process now known, which is the result of a continuous fire and an air-tight annealer combined—a device first essayed by me. Thus I fill and discharge my annealer with infinitely less labor and cost than any other iron-wire annealer now known, the filling and discharging in bulk being first essayed by me, as well as the continuous firing up.

It is obvious that the disk *i* could be used by having the bottom of the cylinder *e* solid and immovable, and opening the top and raising the wire out upon the disk in bulk; but this is not the most perfect method, although it would be better than the present mode in general use, and this would obviously interfere with that portion of my invention of filling and discharging annealing-furnaces in bulk without reducing the fire, by which I am enabled to anneal a much larger quantity in a given time and with less labor and cost of fuel than has heretofore been effected with an air-tight annealer.

Having thus fully described my improvements in annealing iron wire, &c., what I claim therein as new, and for which I desire to secure Letters Patent, is—

1. Charging and discharging an annealing-furnace in bulk, substantially in the manner, and for the purposes set forth.

2. Opening the bottom of the annealer for the purpose of discharging its contents and recharging it, as above set forth, or any mode analogous thereto.

3. The employment of a continuous heat with an air-tight annealer, substantially in the manner and for the purposes described, by which iron wire can be annealed with the same facility as brass and copper where the air is not required to be excluded.

J. JOSEPH EAGLETON.

Witnesses:
J. INGHAM PERRY,
J. J. GREENOUGH.